US007922894B2

(12) United States Patent
Plantenga et al.

(10) Patent No.: US 7,922,894 B2
(45) Date of Patent: *Apr. 12, 2011

(54) HPC PROCESS USING A MIXTURE OF CATALYSTS

(75) Inventors: Frans Lodewijk Plantenga, Hoevelaken (NL); Katsuhisa Fujita, Niihama (JP); Satoshi Abe, Saijo (JP)

(73) Assignees: Albemarle Netherlands, B.V., Amsterdam (NL); Nippon Ketjen Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/730,433

(22) Filed: Dec. 8, 2003

(65) Prior Publication Data
US 2004/0163999 A1 Aug. 26, 2004

Related U.S. Application Data

(60) Provisional application No. 60/431,623, filed on Dec. 6, 2002.

(51) Int. Cl.
*C10G 45/04* (2006.01)
*C10G 47/02* (2006.01)
(52) U.S. Cl. .............. 208/111.35; 208/108; 208/110; 208/111.3; 208/112; 208/213; 208/216 PP; 208/216 R; 208/217; 208/251 H; 208/254 H; 502/313; 502/314
(58) Field of Classification Search .......... 208/111.35, 208/216 PP, 216 R, 217, 251 H, 254 H, 111.3, 208/108, 110, 112, 213; 502/313, 314
See application file for complete search history.

(56) References Cited

U.S. PATENT DOCUMENTS

| | | | | |
|---|---|---|---|---|
| 3,887,455 A | * | 6/1975 | Hamner et al. | 208/112 |
| 3,898,155 A | * | 8/1975 | Wilson | 208/216 PP |
| 4,069,139 A | * | 1/1978 | Riley et al. | 208/216 PP |
| 4,225,421 A | * | 9/1980 | Hensley et al. | 208/216 PP |
| 4,414,141 A | * | 11/1983 | Schindler | 502/314 |
| 4,499,203 A | | 2/1985 | Toulhoat et al. | 502/247 |
| 4,526,675 A | * | 7/1985 | Mahoney et al. | 208/106 |
| 5,100,855 A | | 3/1992 | Clark et al. | 502/211 |
| 5,308,472 A | * | 5/1994 | Dai et al. | 208/111.3 |
| 6,086,749 A | | 7/2000 | Kramer et al. | 208/213 |

FOREIGN PATENT DOCUMENTS

WO 02/100541 12/2002

OTHER PUBLICATIONS

Van Kerkvoort, et al., *Determination of Dry-Sludge Content Of Fuel Oils: Development Of The Shell Hot Filtration Test (SHFT)*, 1951, Inst. Pet., 37, pp. 596-604.
European Search Report of corresponding Patent Application 03075098.

* cited by examiner

*Primary Examiner* — Prem C Singh
(74) *Attorney, Agent, or Firm* — Jeremy J. Kliebert; James A. Jubinsky; Marcy M. Hoefling

(57) ABSTRACT

The present invention pertains to a process for hydroprocessing a heavy hydrocarbon oil, comprising contacting a heavy hydrocarbon oil in the presence of hydrogen with a mixture of hydroprocessing catalyst I and hydroprocessing catalyst II. The process of the invention combines high contaminant removal with high conversion, low sediment formation, and high process flexibility.

10 Claims, No Drawings

HPC PROCESS USING A MIXTURE OF CATALYSTS

CROSS REFERENCE TO RELATED APPLICATIONS

This application claims priority from U.S. patent application Ser. No. 60/431,623, filed Dec. 6, 2002, the content of which is incorporated by reference herein.

BACKGROUND OF THE INVENTION

1. Field of the Invention

The present invention relates to a process for hydroprocessing a heavy hydrocarbon oil, in particular a process in which a mixture of two catalysts is used to obtain advantageous effects in the hydroprocessing of heavy hydrocarbon oils. The present invention also relates to a mixture of catalysts suitable for use in such a process.

2. Prior Art

Hydrocarbon oils containing 50 wt. % or more of components with a boiling point of 538° C. or higher are called heavy hydrocarbon oils. These include atmospheric residue (AR) and vacuum residue (VR), which are produced in petroleum refining. It is desired to remove impurities such as sulfur from these heavy hydrocarbon oils by hydroprocessing, and to convert them into lighter oils, which have a higher economic value.

The hydroprocessing of heavy hydrocarbon oils is done in ebullating bed operation or in fixed bed operation.

For ebullating bed operation, various catalysts have been proposed. Generally, these catalysts are capable of efficiently removing sulfur, Conradson carbon residue (CCR), various metals, nitrogen and/or asphaltenes. However, it was found that the decomposition of asphaltenes, an aggregate of condensed aromatic compounds which is in good balance with the rest of the feedstock, is generally accompanied by the formation of sediment and sludge.

Sediment can be determined by the Shell hot filtration solid test (SHFST). (see Van Kerkvoort et al., J. Inst. Pet., 37, pp. 596-604 (1951)). Its ordinary content is said to be about 0.19 to 1 wt. % in product with a boiling point of 340° C. or higher collected from the bottom of a flash drum.

Sediment formed during hydroprocessing may settle and deposit in such apparatuses as heat exchangers and reactors, and because it threatens to close off the passage, it can seriously hamper the operation of these apparatuses. Especially in the hydroprocessing of heavy hydrocarbon feeds containing large amounts of vacuum residue, sediment formation is an important factor, and there is therefore need for a process for effecting efficient contaminant removal in combination with low sediment formation and high conversion.

U.S. Pat. No. 5,100,855 describes a catalyst mixture for effecting hydrodemetallization, hydrodesulfurization, hydrodenitrogenation and hydroconversion of an asphaltene-containing feedstock, wherein one catalyst is a relatively small-pore catalyst and the other possesses a relatively large amount of macropore volume. The catalyst mixture is preferably applied in an ebullating bed. The first catalyst has less than 0.10 ml/g of pore volume in pores with a diameter above 200 Å, less than 0.02 ml/g in pores with a diameter above 800 Å, and a maximum average mesopore diameter of 130 Å. The second catalyst has more than 0.07 ml/g of pore volume in pores with a diameter of greater than 800 Å.

U.S. Pat. No. 6,086,749 describes a process and catalyst system for use in a moving bed, wherein a mixture of two types of catalysts is used, each designed for a different function such as hydrodemetallization and hydrodenitrogenation, respectively. At least one of the catalysts preferably has at least 75% of its pore volume in pores with a diameter of 100-300 Å, and less than 20% of its pore volume in pores with a diameter below 100 Å.

The object of the present invention is to provide an effective process for the hydroprocessing of a heavy hydrocarbon oil containing a large amount of impurities such as sulfur, Conradson carbon residue, metals, nitrogen, and asphaltene, for adequately removing the impurities. In addition to efficient contaminant removal, the process should show low sediment formation, high asphaltene removal, and high conversion. Further, it should possess high flexibility.

On the basis of diligent research, a catalytic hydroprocessing process was invented wherein a heavy oil is contacted with a mixture of two different hydrotreating catalysts, both catalysts meeting specific requirements as to surface area, pore volume, and pore size distribution. The first catalyst is specifically designed to decrease the impurities in the heavy hydrocarbon oil. In particular, it achieves efficient asphaltene removal in combination with hydrodemetallization. The second catalyst is tailored to effect advanced desulfurisation and hydrogenation reactions while inhibiting sediment formation due to asphaltene precipitation, to allow stable operation.

The use of a mixture of the two different catalysts leads to a synergistic effect resulting in a process showing stable operation, high contaminant removal and conversion activity, and low sediment formation, this in combination with great flexibility in operation.

SUMMARY OF THE INVENTION

In one embodiment, the process according to the invention is a process for hydroprocessing a heavy hydrocarbon oil, comprising contacting a heavy hydrocarbon oil in the presence of hydrogen with a mixture of hydroprocessing catalyst I and hydroprocessing catalyst II wherein catalyst I comprises a Group VIB metal component and optionally a Group VIII metal component on a porous inorganic carrier, said catalyst having a specific surface area of at least 100 m$^2$/g, a total pore volume of at least 0.55 ml/g, at least 50% of the total pore volume in pores with a diameter of at least 20 nm (200 Å) and at least 65% of the total pore volume in pores with a diameter of 10-120 nm (100-1200 Å), and catalyst II comprises a Group VIB metal component and optionally a Group VIII metal component on a porous inorganic carrier, said catalyst having a specific surface area of at least 100 m$^2$/g, a total pore volume of at least 0.55 ml/g, 30-80% of the pore volume in pores with a diameter of 10-20 nm (100-200 Å), and at least 5% of the pore volume in pores with a diameter of at least 100 nm (1000 Å) with catalyst I having a larger percentage of its pore volume in pores with a diameter of at least 20 nm (200 Å) than catalyst II.

In a second embodiment, the present invention also pertains to a catalyst mixture suitable for use in such a process, wherein the catalyst mixture comprises catalysts I and II defined above.

Other embodiments of the invention relate to details such as process conditions and catalyst compositions, all of which are hereinafter described.

DETAILED DESCRIPTION OF THE INVENTION

More particularly, the present invention relates to a process suitable for the hydroprocessing of heavy hydrocarbon oils containing a large amount of impurities such as sulfur, metals, and asphaltene to effect hydrodesulfurisation (HDS), hydrodemetallization (HDM), asphaltene reduction (HDAsp) and/or conversion into lighter products, while limiting the amount of sediment produced. The feed may also contain other contaminants such as Conradson carbon residue (CCR) and nitrogen, and carbon residue reduction (HDCCR) and hydrodenitrification (HDN) may also be desired processes.

The catalysts used in the process according to the invention comprise catalytic materials on a porous carrier. The catalytic materials present on the catalysts used in the process according to the invention comprise a Group VIB metal and optionally a Group VIII metal of the Periodic Table of Elements applied by Chemical Abstract Services (CAS system). It is preferred for a Group VIII metal to be present on the catalysts used in the process according to the invention. The Group VIII metal used in this invention is at least one selected from nickel, cobalt, and iron. In view of performance and economy, cobalt and nickel are preferred. Nickel is especially preferred. As the Group VIB metals which can be used, molybdenum, tungsten, and chromium may be mentioned, but in view of performance and economy, molybdenum is preferred. The combination of molybdenum and nickel is particularly preferred for the catalytic materials of the catalyst according to the invention.

Based on the weight (100 wt. %) of the final catalyst, the amounts of the respective catalytic materials used in the catalysts used in the process according to the invention are as follows.

The catalysts generally comprise 4-30 wt. % of Group VIB metal, calculated as trioxide, preferably 7-20 wt. %, more preferably 8-16 wt. %. If less than 4 wt. % is used, the activity of the catalyst is generally less than optimal. On the other hand, if more than 16 wt. %, in particular more than 20 wt. % is used, the catalytic performance is generally not improved further.

Optimum results are obtained when the Group VIB metal content is selected to be within the cited preferred ranges.

As indicated above, it is preferred for the catalysts to comprise a Group VIII metal component. If applied, this component is preferably present in an amount of 0.5-6 wt. %, more preferably 1-5 wt. %, of Group VIII metal, calculated as oxide. If the amount is less than 0.5 wt. %, the activity of the catalysts is less than optimal. If more than 6 wt. % is present, the catalyst performance will not be improved further.

The total pore volume of Catalyst I and Catalyst II is at least 0.55 ml/g, preferably at least 0.6 ml/g. It is preferred for it to be at most 1.0 ml/g, more preferably at most 0.9 ml/g. The determination of the total pore volume and the pore size distribution is effected via mercury penetration at a contact angle of 140° with a surface tension of 480 dynes/cm, using, for example, a mercury porosimeter Autopore II (trade name) produced by Micrometrics.

Catalyst I has a specific surface area of at least 100 m$^2$/g. For the catalyst to meet the required pore size distribution ranges it is preferred for it to have a surface area of 100-180 m$^2$/g, preferably 130-170 m$^2$/g. If the surface area is less than 100 m$^2$/g, the catalytic activity will be too low. In the present specification the surface area is determined in accordance with the BET method based on N$_2$ adsorption.

Catalyst I has at least 50% of the total pore volume in pores with a diameter of at least 20 nm (200 Å), preferably at least 60%. The percentage of pore volume in this range is preferably at most 80%. If the percentage of pore volume in this range is below 50%, the catalytic performance, especially the asphaltene cracking activity, decreases. As a result thereof, sediment formation will increase.

Catalyst I has at least 65% of the total pore volume in pores with a diameter of 10-120 nm (100-1200 A), preferably at least 75%, more preferably at least 85%. If the percentage of pore volume in this range is insufficient, sediment formation will increase and the residual cracking rate will decrease. Additionally, it is preferred for Catalyst I to have less than 25%, more preferably less than 17%, still more preferably less than 10%, of its pore volume in pores with a diameter of 10 nm (100 A) or less. If the percentage of pore volume present in this range is too high, sediment formation may increase due to increased hydrogenation of the non-asphaltenic feed constituents.

Catalyst I is based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier to consist for at least 80% of alumina, more preferably at least 90%, still more preferably at least 95%. A carrier consisting essentially of alumina is most preferred, the wording "consisting essentially of" being intended to mean that minor amounts of other components may be present, as long as they do not detrimentally affect the catalytic activity of the catalyst.

Catalyst II has a surface area of at least 100 m$^2$/g, preferably at least 150 m$^2$/g, more preferably at least 185 m$^2$/g. The surface area is preferably at most 250 m$^2$/g. If the surface area is outside the claimed range, the catalytic performance is insufficient.

Catalyst II has 30-80% of the total pore volume in pores with a diameter of 10-20 nm (100-200 521 ), preferably 35-75%, more preferably 40-65%. If less than 30% of the pore volume is present in this range, the catalyst performance is insufficient. If more than 80% of the total pore volume is present in this range, the sediment formation increases.

At least 5% of the total pore volume of Catalyst II is present in pores with a diameter of at least 100 nm (1000 Å), preferably between 8 and 30%, more preferably between 8 and 25%. If less than 5% of the pore volume is present in this range, the asphaltene cracking activity decreases, which leads to increased sediment formation. If the percentage of pore volume present in pores with a diameter of at least 100 nm (1000 Å) is above 25%, particularly above 30%, the sediment formation may increase.

Additionally, it is preferred for Catalyst II to have less than 25% of its pore volume in pores with a diameter of 10 nm (100 Å) or less. If the percentage of pore volume present in this range is above this value, sediment formation may increase due to increased hydrogenation of the non-asphaltenic feed constituents.

Catalyst II preferably has less than 50% of its pore volume present in pores with a diameter of at least 20 nm (200 Å), more preferably less than 40%. If this requirement is met, catalyst II will show particularly good hydrodesulfurisation activity and good hydrogenation activity.

Catalyst II generally has a substantial portion of its surface area present in relatively large pores, that is, pores with a diameter of 15-120 nm (150-1200 Å). Preferably, the catalyst has at least 25 m$^2$/g of surface area in pores within this range (as determined via mercury intrusion), more preferably at least 35m$^2$/g. On the other hand, catalyst II generally has only a limited amount of its surface area in relatively small pores, that is, pores with a diameter of 5-7 nm (50-70 Å). Preferably, the catalyst has less than 40 m$^2$/g of surface area in pores within this range, more preferably less than 20 m$^2$/g.

Catalyst II is also based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier of catalyst II to comprise at least 3.5 wt. % of silica, calculated on the weight of the final catalyst, preferably 3.5-30 wt. %, more preferably 4-12 wt. %, even more preferably 4.5-10 wt. %. If less than 3.5 wt. % of silica is present, the performance of the catalyst is less pronounced. The balance of the carrier of the Catalyst II is generally be made up of alumina, optionally containing other refractory oxides, such as titania, zirconia, etc. It is preferred that the balance of the carrier of catalyst II is made up of at least 90% of alumina, more preferably at least 95%. It is preferred for the carrier of the catalyst of the invention to consist essentially of silica and alumina, the wording "consists essentially of" being intended to mean that minor amounts of other components may be present, as long as they do not affect the catalytic activity of the catalyst.

In a further preferred embodiment, Catalyst II comprises a Group IA metal component. Sodium and potassium may be mentioned as suitable materials. Sodium is preferred for reasons of performance and economy. The amount of Group IA metal is 0.1-2 wt. %, preferably 0.2-1 wt. %, more preferably 0.1-0.5 wt. %, calculated as oxide on the catalyst. If less than 0.1 wt. % is present, the desired effect will not be obtained. If more than 2 wt. % is present, or sometimes more than 1 wt. %, the activity of the catalyst will be adversely affected.

It may additionally be preferred for catalyst II to comprise a compound of Group VA, more in particular one or more compounds selected from phosphorus, arsenic, antimony, and bismuth. Phosphorus is preferred. The compound in this case preferably is present in an amount of 0.05-3 wt. %, more preferably 0.1-2 wt. %., still more preferably 0.1-1 wt. %, calculated as $P_2O_5$.

A particularly preferred embodiment of catalyst II comprises the combination of silica and a Group IA metal component, in particular sodium, as described above.

Another particularly preferred embodiment of catalyst II comprises the combination of silica and phosphorus as described above.

Still another particularly preferred embodiment of catalyst II comprises the combination of silica, Group IA metal component, in particular sodium, and phosphorus as described above.

Catalyst I has a higher percentage of its pore volume present in pores with a diameter of at least 20 nm (200 Å) than catalyst II. If this requirement is not met, the advantageous effects of the present invention will not be obtained. Preferably, the % PV($\geqq$200 Å) for catalyst I is at least 5% higher than the % PV($\geqq$200 Å) for catalyst II, more preferably at least 10%, still more preferably at least 20%.

As indicated above, the present invention is directed to a mixture of catalyst I and catalyst II and its use in the hydroprocessing of heavy hydrocarbon feeds. In the context of the present invention, the term mixture is intended to refer to a catalyst system wherein, when the catalyst has been brought into the unit, both the top half of the catalyst volume and the bottom half of the catalyst volume contain at least 1% of both types of catalyst. The term mixture is not intended to refer to a catalyst system wherein the feed is first contacted with one type of catalyst and then with the other type of catalyst. The term catalyst volume is intended to refer to the volume of catalyst comprising both catalyst I and catalyst II. Optional following layers or units comprising other catalyst types are not included therein.

It is preferred for the mixture in the context of the present invention to be such that if the catalyst volume is horizontally divided into four parts of equal volume, each part contains at least 1% of both types of catalyst. It is even more preferred for the mixture in the context of the present invention to be such that if the catalyst volume is horizontally divided into ten parts of equal volume, each part contains at least 1% of both types of catalyst.

In the above definitions, at least 1% of both types of catalyst should be present in the indicated section, preferably at least 5%, more preferably at least 10%.

Obviously it is not intended for, e.g., the right-hand half of the unit to be filled with one type of catalyst while the left-hand half of the unit is filled with another type of catalyst. Accordingly, the word mixture as applied in the present invention also requires that both the right-hand side and the left hand side of the catalyst volume contain at least 1% of both types of catalyst. Preferably, if the catalyst volume is vertically divided into four parts of equal volume, each part contains at least 1% of both types of catalyst. More preferably, if the catalyst volume is vertically divided into ten parts of equal volume, each part contains at least 1% of both types of catalyst. In the definitions in this paragraph, at least 1% of both types of catalyst should be present in the indicated section, preferably at least 5%, more preferably at least 10%.

There are various ways in which a catalyst mixture can be obtained. The first one, which is inherent to ebullating bed operation and preferred for fixed bed operation, is a random mixture of the two types of catalyst particles. With regard to ebullating bed operation it should be noted that the word random includes natural segregation taking place in the unit due to differences in density between the catalyst particles.

A further method applicable to fixed bed units would be to apply the two types of catalysts in (thin) alternating layers.

An additional method would be to sock-load the unit with socks of the two types of catalysts, wherein each sock contains one type of catalyst, but wherein the combination of socks results in a mixture of catalysts as defined above.

Overall, the mixture of catalysts I and II generally comprises 2-98 wt. % of catalyst I and 2-98 wt. % of catalyst II. Preferably, the mixture comprises 10-90 wt. % of catalyst I, more preferably 20-80 wt. % of catalyst I, still more preferably 30-70 wt. % of catalyst 1. The mixture preferably comprises 10-90 wt. % of catalyst II, more preferably 20-80 wt. % of catalyst II, still more preferably 30-70 wt. % of catalyst II.

The catalyst particles may have the shapes and dimensions common to the art. Thus, the particles may be spherical, cylindrical, or polylobal and their diameter may range from 0.5 to 10 mm. Particles with a diameter of 0.5-3 mm, preferably 0.7-1.2 mm, for example 0.9-1 mm, and a length of 2-10 mm, for example 2.5-4.5 mm, are preferred. For use in fixed bed operation polylobal particles are preferred, because they lead to a reduced pressure drop in hydrodemetallization operations. Cylindrical particles are preferred for use in ebullating bed operations.

The carrier to be used in the catalysts to be used in the process according to the invention can be prepared by processes known in the art. A typical production process for a carrier comprising alumina is coprecipitation of sodium aluminate and aluminum sulfate. The resulting gel is dried, extruded, and calcined, to obtain an alumina-containing carrier.

Optionally, other components such as silica may be added before, during, or after precipitation.

By way of example, a process for preparing an alumina gel will be described below. At first, a tank containing tap water or warm water is charged with an alkali solution of sodium aluminate, aluminum hydroxide or sodium hydroxide, etc., and an acidic aluminum solution of aluminum sulfate or aluminum nitrate, etc. is added for mixing. The hydrogen ion concentration (pH) of the mixed solution changes with the progression of the reaction. It is preferable that when the addition of the acidic aluminum solution is completed, the pH is 7 to 9, and that during mixing, the temperature is 60 to 75° C. The mixture is then kept at that temperature for, in general, 0.5-1.5 hours, preferably for 40-80 minutes.

By way of a further example, a process for preparing a silica-containing alumina gel is described below. First, an alkali solution such as sodium aluminate, ammonium hydroxide or sodium hydroxide is fed into a tank containing tap water or hot water, an acid solution of an aluminum source, e.g., aluminum sulfate or aluminum nitrate, is added, and the resulting mixture is mixed. The pH of the mixture changes as the reaction progresses.

Preferably, after all the acid aluminum compound solution has been added, the pH is 7 to 9. After completion of the mixing an alumina hydrogel can be obtained. Then, an alkali metal silicate such as a water glass or an organic silica solution is added as silica source. To mix the silica source, it can be fed into the tank together with the acid aluminum compound solution or after the aluminum hydrogel has been produced.

The silica-containing alumina carrier can, for another example, be produced by combining a silica source such as sodium silicate with an alumina source such as sodium aluminate or aluminum sulfate, or by mixing an alumina gel with a silica gel, followed by moulding, drying, and calcining. The carrier can also be produced by causing alumina to precipitate in the presence of silica in order to form an aggregate mixture of silica and alumina. Examples of such processes are adding a sodium aluminate solution to a silica hydrogel and increasing the pH by the addition of, e.g., sodium hydroxide to precipitate alumina, and coprecipitating sodium silicate with aluminum sulfate.

A further possibility is to immerse the alumina carrier, before or after calcination, into an impregnation solution comprising a silicon source dissolved therein.

In a following stage, the gel separated from the solution, and any commercially used washing treatment, for example a washing treatment using tap water or hot water, is carried out to remove impurities, mainly salts, from the gel. Then, the gel is shaped into particles in a manner known in the art, e.g., by way of extrusion, beading or pelletizing.

Finally, the shaped particles are dried and calcined. The drying is generally carried out at a temperature between room temperature up to 200° C., generally in the presence of air,. The calcining is generally carried out at a temperature of 300 to 950° C., preferably 600 to 900° C., generally in the presence of air, for a period of 30 minutes to six hours. If so desired, the calcination may be carried out in the presence of steam to influence the crystal growth in the oxide.

By the above production process, it is possible to obtain a carrier having properties which will give a catalyst with the surface area, pore volume, and pore size distribution characteristics specified above. The surface area, pore volume, and pore size distribution characteristics can be adjusted in a manner know to the skilled person, for example by the addition during the mixing or shaping stage of an acid, such as nitric acid, acetic acid or formic acid, or other compounds as moulding auxiliary, or by regulating the water content of the gel by adding or removing water.

The carrier of the catalysts to be used in the process according to the invention have a specific surface area, pore volume, and pore size distribution of the same order as that of the catalysts themselves. The carrier of catalyst I preferably has a surface area of 100-200 m$^2$/g, more preferably 130-170 m$^2$/g.

The total pore volume is preferably 0.5-1.2 ml/g, more preferably 0.7-1.0 ml/g. The carrier of catalyst II preferably has a surface area of 180-300 m$^2$/g, more preferably 190-240 m$^2$/g and a pore volume of 0.5-1.0 ml/g, more preferably 0.6-0.9 ml/g.

The Group VIB metal components, and, where appropriate, Group VIII metal components, Group IA metal components, or other components such as phosphorus can be incorporated into the catalyst carrier in a conventional manner, e.g., by impregnation and/or by incorporation into the support material before it is shaped into particles. At this point in time it is considered preferred to first prepare the carrier and incorporate the catalytic materials into the carrier after it has been dried and calcined. The metal components can be incorporated into the catalyst composition in the form of suitable precursors, preferably by impregnating the catalyst with an acidic or basic impregnation solution comprising suitable metal precursors.

For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. Suitable Group IA metal precursors include nitrates and carbonates.

For phosphorus, phosphoric acid may be used.

The impregnation solution, if applied, may contain other compounds the use of which is known in the art, such as organic acids, e.g., citric acid, ammonia water, hydrogen peroxide water, gluconic acid, tartaric acid, malic acid or EDTA (ethylenediamine tetraacetic acid). It will be clear to the skilled person that there is a wide range of variations on this process. Thus, it is possible to apply a plurality of impregnating stages, the impregnating solutions to be used containing one or more of the component precursors that are to be deposited, or a portion thereof. Instead of impregnating techniques, dipping processes, spraying processes, etc. can be used. In the case of multiple impregnation, dipping, etc., drying and/or calcining may be carried out in between.

After the metals have been incorporated into the catalyst composition, it is optionally dried, e.g., in air flow for about 0.5 to 16 hours at a temperature between room temperature and 200° C., and subsequently calcined, generally in air, for about 1 to 6 hours, preferably 1-3 hours at 200-800° C., preferably 450-600° C. The drying is done to physically remove the deposited water. The calcining is done to bring at least part, preferably all, of the metal component precursors to the oxide form.

It may be desirable to convert the catalysts, i.e., the Group VIB and optional Group VIII metal components present therein, into the sulfidic form prior to their use in the hydroprocessing of hydrocarbon feedstocks. This can be done in an otherwise conventional manner, e.g., by contacting the catalyst in the reactor at increasing temperature with hydrogen and a sulfur-containing feedstock, or with a mixture of hydrogen and hydrogen sulfide. Ex situ presulfiding is also possible.

The process of the present invention is particularly suitable for the hydroprocessing of heavy hydrocarbon feeds. It is particularly suitable for hydroprocessing of heavy feedstocks of which at least 50 wt. % boils above 538° C. (1000° F.) and which comprise at least 2 wt. % of sulfur and at least 5 wt. % of Conradson carbon. The sulfur content of the feedstock may be above 3 wt. %. Its Conradson carbon content may be above 8 wt. %.

The feedstock may contain contaminant metals, such as nickel and vanadium. Typically, these metals are present in an amount of at least 20 wtppm, calculated on the total of Ni and V, more particularly in an amount of at least 30 wtppm. The asphaltene content of the feedstock is preferably between 2 and 10 wt. %, more preferably between 3 and 7 wt. %.

Suitable feedstocks include atmospheric residue, vacuum residue, residues blended with gas oils, particularly vacuum gas oils, crudes, shale oils, tar sand oils, solvent deasphalted oil, coal liquefied oil, etc. Typically they are atmospheric residue (AR), vacuum residue (VR), and mixtures thereof.

The process according to the invention can be carried out in a fixed bed, in a moving bed, or in an ebullated bed. It is particularly preferred to carry it out in an ebullating bed.

The process according to the invention can be carried out in a single reactor or in multiple reactors. If multiple reactors are used, the catalyst mixture used in the two reactors may be the same or different. If two reactors are used, one may or may not one perform or more of intermediate phase separation, stripping, $H_2$ quenching, etc. between the two stages.

The process conditions for the process according to the invention may be as follows. The temperature generally is 350-450° C., preferably 400-440° C. The pressure generally is 5-25 MPA, preferably 14-19 MPA. The liquid hourly space velocity generally is 0.1-3 h-1, preferably 0.3-2 h-1. The hydrogen to feed ratio generally is 300-1,500 Nl/l, preferably 600-1000 Nl/l. The process is carried out in the liquid phase.

The invention will be elucidated below by way of the following examples, though it must not be deemed limited thereto or thereby.

EXAMPLE 1

Preparation of Catalyst A

A sodium aluminate solution and an aluminum sulfate solution were simultaneously added dropwise to a tank containing tap water, mixed at pH 8.5 at 65° C., and held for 70 minutes. The thus produced alumina hydrate gel was separated from the solution and washed with warm water, to remove the impurities in the gel. Then, the gel was kneaded for about 20 minutes and extruded as cylindrical particles having a diameter of 0.9 to 1 mm and a length of 3.5 mm. The extruded alumina particles were dried at 120° C. for 16 hours and calcined at 900° C. for 2 hours, to obtain an alumina carrier.

100 g of the alumina carrier obtained as described above were immersed in 100 ml of a citric acid solution containing 16.4 g of ammonium molybdate tetrahydrate and 9.8 g of nickel nitrate hexahydrate at 25° C. for 45 minutes, to obtain a carrier loaded with metallic components.

Subsequently, the loaded carrier was dried at 120° C. for 30 minutes and calcined at 540° C. for 1.5 hours, to complete a catalyst. The amounts of the respective components in the produced catalyst and the properties of the catalyst are shown in Table 1. Catalyst A meets the requirements of Catalyst I of the present invention.

Preparation of Catalyst B

To produce a silica-alumina carrier, a sodium aluminate solution was supplied to a tank containing tap water, and an aluminum sulfate solution was added and mixed. When the addition of the aluminum sulfate solution was completed, the mixture had a pH of 8.5. The mixture was kept at 64° C. for 1.5 hours. Then, a sodium silicate solution was added and mixed. By such mixing a silica-alumina gel was produced. The sodium silicate concentration was set at 1.6 wt. % of the alumina gel solution.

The silica-alumina gel was isolated by filtration and washed with hot water to remove impurities from the gel. It was then extruded into cylindrical grains with a diameter of 0.9-1 mm and a length of 3.5 mm. The resulting particles were dried in air at a temperature of 120° C. for 16 hours and subsequently calcined in the presence of air for two hours at 800° C. to obtain a silica-alumina carrier. The silica-content of the obtained carrier was 7 wt. %.

One hundred grams of the thus obtained silica-alumina carrier were impregnated with 100 ml of an impregnation solution containing 13.4 g of ammonium molybdate tetrahydrate, 11.2 g of nickel nitrate hexahydrate, 0.68 g of sodium nitrate, and 50 ml of 25% ammonia water. The impregnated carrier was then dried at a temperature of 120° C. for 30 minutes and calcined in a kiln for 1.5 hours at 540° C. to produce a final catalyst. The composition and properties of this catalyst are given in Table 1. Catalyst B meets the requirements of Catalyst II of the present invention.

TABLE 1

|  | Catalyst A | Catalyst B |
| --- | --- | --- |
| Carrier | alumina | Al2O3 + 6% SiO$_2$ |
| Group VIB wt. % ox | 11.9 | 11.5 |
| Group VIII wt. % ox | 2.0 | 2.1 |
| Group IA wt. % ox | 0 | 0.26 |
| Surface area m$^2$/g | 147 | 214 |
| total pore volume ml/g | 0.79 | 0.75 |
| % PV($\geq$200 Å) | 74 | 22.6 |
| % PV(100-200 Å) | 25 | 64 |
| % PV(100-1200 Å) | 89 | 75 |
| % PV($\geq$1000 Å) | 11 | 10 |
| % PV($\leq$100 Å) | 0.4 | 12 |

Catalysts A and B were tested in various combinations in the hydroprocessing of a heavy hydrocarbon feedstock. The feedstock used in these examples was a Middle East petroleum consisting of 50 wt. % of vacuum residue (VR) and 50 wt. % of atmospheric residue (AR). The composition and properties of the feed are given in Table 2.

TABLE 2

| Feedstock composition Middle East petroleum (VR:AR = 50:50) | |
| --- | --- |
| Sulfur (wt. %) | 4.79 |
| Nitrogen (wppm) | 2890 |
| Metals - vanadium (wppm) | 85 |
| Metals - nickel (wppm) | 26 |
| Conradson Carbon residue (wt. %) | 16.2 |
| C7 - insolubles[1] (wt. %) | 6.0 |
| Vacuum residue[2] (wt. %) | 75 |
| Density (g/ml at 15° C.) | 1.0048 |

[1]Matter insoluble in n-heptane
[2]Fraction boiling above 538° C. in accordance with ASTM D 5307 (distillation gas chromatography)

A mixture of Catalysts A and B was packed into a fixed bed reactor in the combinations given in Table 3 below. The catalyst bed contained equal volume amounts of catalyst.

The feedstock was introduced into the unit in the liquid phase at a liquid hourly space velocity of 1.5 h-1, a pressure of 16.0 MPa, an average temperature of 427° C., with the ratio of supplied hydrogen to feedstock ($H_2$/oil) being kept at 800 Nl/l.

The oil product produced by this process was collected and analysed to calculate the amounts of sulfur (S), metals (vanadium+nickel) (M), and asphaltene (Asp) removed by the process, as well as the 538° C.+fraction. The relative volume activity values were obtained from the following formulae.

$RVA=100*k(\text{tested catalyst combination})/k(\text{comparative catalyst combination 1})$ wherein for HDS $k=(LHSV/(0.7))*(1/y^{0.7}-1/x^{0.7})$ and for HDM and asphaltene removal $k=LHSV*ln(x/y)$ with x being the content of S, M, or Asp in the feedstock, and y being the content of S, M, or Asp in the product.

The cracking rate, also indicated as vacuum residu cracking rate, is the conversion of the fraction boiling above 538° C. into product boiling below 538° C.

TABLE 3

|  | C. 1 | C.C. 1 | C.C. 2 |
|---|---|---|---|
| Catalyst I | A | A | B |
| Catalyst II | B | A | B |
| HDS | 119 | 100 | 126 |
| HDM | 99 | 100 | 76 |
| Asphaltene removal | 101 | 100 | 81 |
| VR cracking rate | 42 | 41 | 42 |
| Sediment[1] | 0.08 | 0.02 | 0.29 |

[1]Sediment determined in accordance with the IP 375 method of the English Institute of Petroleum From the above Table it can be seen that, as compared with the comparative catalyst combinations, the catalyst system according to the invention combines good hydrodesulfurisation, hydrodemetallization, and asphaltene removal with a high cracking rate and low sediment formation.

The invention claimed is:

1. A process for hydroprocessing a heavy hydrocarbon oil, comprising contacting a heavy hydrocarbon oil in the presence of hydrogen with a mixture of hydroprocessing catalyst I and hydroprocessing catalyst II wherein catalyst I comprises a Group VIB metal component and optionally a Group VIII metal component on a porous inorganic carrier, said catalyst having a specific surface area of 100-180 m$^2$/g, a total pore volume of at least 0.55 ml/g, and a pore size distribution for inhibiting sediment formation and promoting asphaltene removal such that at least 50% of the total pore volume in pores with a diameter of at least 20 nm (200 Å) and at least 65% of the total pore volume in pores with a diameter of 10-120 nm (100-1200 Å), wherein less than 25% of the total pore volume of catalyst I is in pores having a diameter of 10 nm (100 Å) or less, and catalyst II comprises a Group VIB metal component and optionally a Group VIII metal component on a porous inorganic carrier, said catalyst having a specific surface area of at least 100 m$^2$/g, and a pore size distribution for providing catalytic activity and inhibiting sediment formation such that a total pore volume of at least 0.55 ml/g, 30-80% of the pore volume in pores with a diameter of 10-20 nm (100-200 Å), and at least 5% of the pore volume in pores with a diameter of at least 100 nm (1000 Å), wherein less than 25% of the total pore volume of catalyst II is in pores having a diameter of 10 nm (100 Å) or less, and wherein catalyst I has a larger percentage of its pore volume in pores with a diameter of at least 20 nm (200 Å) than catalyst II.

2. The process of claim 1 wherein the carrier of catalyst I consists essentially of alumina and/or wherein the carrier of catalyst II consists essentially of alumina and at least 3.5 wt. % of silica, and/or wherein catalyst II comprises 0.1-2 wt. % of a Group IA metal component.

3. The process of claim 1 wherein catalyst II has less than 50% of its pore volume in pores with a diameter of at least 20 nm (200 Å).

4. The process of claim 1 wherein catalyst I and/or catalyst II comprise 7 to 20 wt. % of a Group VIB metal component, calculated as trioxide on the weight of the catalyst, and 0.5 to 6 wt. % of a Group VIII metal component, calculated as oxide on the weight of the catalyst.

5. The process of claim 1 wherein the heavy hydrocarbon feed is a feed of which at least 50 wt. % boils above 538° C. (1000° F.) and which comprises at least 2 wt. % of sulfur and at least 5 wt. % of Conradson carbon.

6. The process of claim 1 which is carried out in an ebullating bed.

7. A mixture of catalysts comprising a catalyst I which comprises a Group VIB metal component and optionally a Group VIII metal component on a porous inorganic carrier, said catalyst having a specific surface area of 100-180 m$^2$/g, a total pore volume of at least 0.55 ml/g, and a pore size distribution for inhibiting sediment formation and promoting asphaltene removal such that at least 50% of the total pore volume in pores with a diameter of at least 20 nm (200 Å) and at least 65% of the total pore volume in pores with a diameter of 10-120 nm (100-1200 Å), wherein less than 25% of the total pore volume of catalyst I is in pores having a diameter of 10 nm (100 Å) or less, and a catalyst II which comprises a Group VIB metal component and optionally a Group VIII metal component on a porous inorganic carrier, said catalyst having a specific surface area of at least 100 m$^2$/g, and a pore size distribution for providing catalytic activity and inhibiting sediment formation such that a total pore volume of at least 0.55 ml/g, 30-80% of the pore volume in pores with a diameter of 10-20 nm (100-200 Å), and at least 5% of the pore volume in pores with a diameter of at least 100 nm (1000 Å), wherein less than 25% of the total pore volume of catalyst II is in pores having a diameter of 10 nm (100 Å) or less, and wherein catalyst I has a larger percentage of its pore volume in pores with a diameter of at least 20 nm (200 Å) than catalyst II.

8. The catalyst mixture of claim 7 wherein the carrier of catalyst I consists essentially of alumina and/or wherein the carrier of catalyst II consists essentially of alumina and at least 3.5 wt. % of silica.

9. The catalyst mixture of claim 7 wherein catalyst II has less than 50% of its pore volume in pores with a diameter above 200 Å.

10. The catalyst mixture of claim 7 wherein catalyst I and/or catalyst II comprise 7 to 20 wt. % of a Group VIB metal component, calculated as trioxide on the weight of the catalyst, and 0.5 to 6 wt. % of a Group VIII metal component, calculated as oxide on the weight of the catalyst.

* * * * *